US008817684B2

United States Patent
Hao et al.

(10) Patent No.: US 8,817,684 B2
(45) Date of Patent: Aug. 26, 2014

(54) ADAPTIVE MOBILE MULTICASTING FOR WIRELESS NETWORKS

(75) Inventors: Jack Jianxiu Hao, Lexington, MA (US); Shaygan Kheradpir, New York, NY (US); John F. Gallagher, Hopewell, NJ (US); Diego Sebastian Rozensztejn, Brighton, MA (US); Xuefeng Yao, Waban, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 616 days.

(21) Appl. No.: 12/971,616

(22) Filed: Dec. 17, 2010

(65) Prior Publication Data

US 2012/0155358 A1 Jun. 21, 2012

(51) Int. Cl.
*H04H 20/71* (2008.01)
*H04W 4/00* (2009.01)

(52) U.S. Cl.
USPC .......................................... 370/312; 370/332

(58) Field of Classification Search
USPC .................................. 370/310–338
See application file for complete search history.

(56) References Cited

U.S. PATENT DOCUMENTS

| | | | | |
|---|---|---|---|---|
| 7,373,394 | B1 * | 5/2008 | Li et al. .......................... | 709/219 |
| 8,001,217 | B1 * | 8/2011 | Pan et al. ...................... | 709/219 |
| 2002/0025826 | A1 * | 2/2002 | Aaltonen et al. .............. | 455/522 |
| 2002/0194303 | A1 * | 12/2002 | Suila et al. .................... | 709/219 |
| 2005/0232292 | A1 * | 10/2005 | Richards et al. .............. | 370/432 |
| 2008/0069071 | A1 * | 3/2008 | Tang ............................. | 370/342 |
| 2009/0296610 | A1 * | 12/2009 | Bugenhagen ................. | 370/286 |
| 2010/0064335 | A1 * | 3/2010 | Jenkin et al. .................. | 725/110 |
| 2012/0144445 | A1 * | 6/2012 | Bonta et al. ................... | 725/116 |

* cited by examiner

*Primary Examiner* — Xavier Szewai Wong (57) ABSTRACT

Video streams may be adaptively switched between multicast and unicast transmission over a wireless interface of a wireless network. A device may track a quantity of videos that are being streamed over the wireless network. The device may determine, based on the tracked quantity of videos, whether to dedicate a radio channel, of at least one cell in the wireless network, to streaming a first of the videos. The device may transmit, in response to a request, from a mobile device, for the first video, an identification of the dedicated radio channel so that the mobile device can receive the first video as a streaming video over the dedicated radio channel.

14 Claims, 11 Drawing Sheets

| STREAMS | CELL1 | CELL2 | CELL3 | CELL4 | CELL5 |
|---|---|---|---|---|---|
| LIVE PROGRAM 1 | 5 | 200 | 100 | 10 | 20 |
| LIVE PROGRAM 2 | 0 | 2 | 1 | 0 | 0 |
| LIVE PROGRAM 3 | 1 | 50 | 1 | 0 | 0 |
| LIVE PROGRAM 4 | 2 | 100 | 50 | 5 | 10 |
| LIVE PROGRAM 5 | 1 | 1 | 1 | 0 | 1 |

| STREAMS | CHANNEL ID | CDN URL FOR MULTICAST |
|---|---|---|
| LIVE PROGRAM 1 | 100 | HTTP://MOBILEMULTI.COM/LIVEPROGRAM1 |
| LIVE PROGRAM 3 | 101 | HTTP://MOBILEMULTI.COM/LIVEPROGRAM3 |
| LIVE PROGRAM 4 | 104 | HTTP://MOBILEMULTI.COM/LIVEPROGRAM4 |

Fig. 8B

| STREAMS | CDN URL FOR UNICAST |
|---|---|
| LIVE PROGRAM 1 | HTTP://MOBILEUNI.COM/LIVEPROGRAM1 |
| LIVE PROGRAM 2 | HTTP://MOBILEUNI.COM/LIVEPROGRAM2 |
| LIVE PROGRAM 3 | HTTP://MOBILEUNI.COM/LIVEPROGRAM3 |
| LIVE PROGRAM 4 | HTTP://MOBILEUNI.COM/LIVEPROGRAM4 |
| LIVE PROGRAM 5 | HTTP://MOBILEUNI.COM/LIVEPROGRAM5 |

ADAPTIVE MOBILE MULTICASTING FOR WIRELESS NETWORKS

BACKGROUND INFORMATION

In an increasingly networked world, more and more traffic, such as data, voice, and video, is transmitted over public and proprietary networks. Wireless networks, in particular, are becoming increasingly popular as networks through which subscribers obtain both voice services (e.g., telephone calls) and data services (e.g., email and web surfing).

One class of mobile wireless devices, such as smartphones and tablet (e.g., "pad") computing devices, may include mobile communication devices that are designed to provide additional functionality, such as the ability to execute a variety of general purpose computing applications. Video and video related services, in particular, may be provided through these devices.

When providing video over a wireless network, it may be important to intelligently deliver the video to the mobile devices to limit strain on the wireless network. One known technique for streaming video is known as multicast. With wireless multicast, a single channel may be used to broadcast a video stream to multiple mobile devices. In contrast, with a unicast wireless transmission, a video stream may be transmitted over a channel that is dedicated to a single mobile device.

DETAILED DESCRIPTION OF PREFERRED EMBODIMENTS

The following detailed description refers to the accompanying drawings. The same reference numbers in different drawings identify the same or similar elements.

Systems and methods described herein relate to providing a "virtual" set-top box (STB) as an application on a wireless mobile device. The STB application may provide a number of functions relating to viewing, controlling, and interacting with video content. The delivery of video content (video streams) to the STB application may be adaptively switched between multicast and unicast transmission, over the wireless interface, based on the current viewing pattern of a number of mobile devices. By adaptively switching between multicast and unicast transmissions, the air interface portion of the wireless network may be efficiently used.

Figure 1:
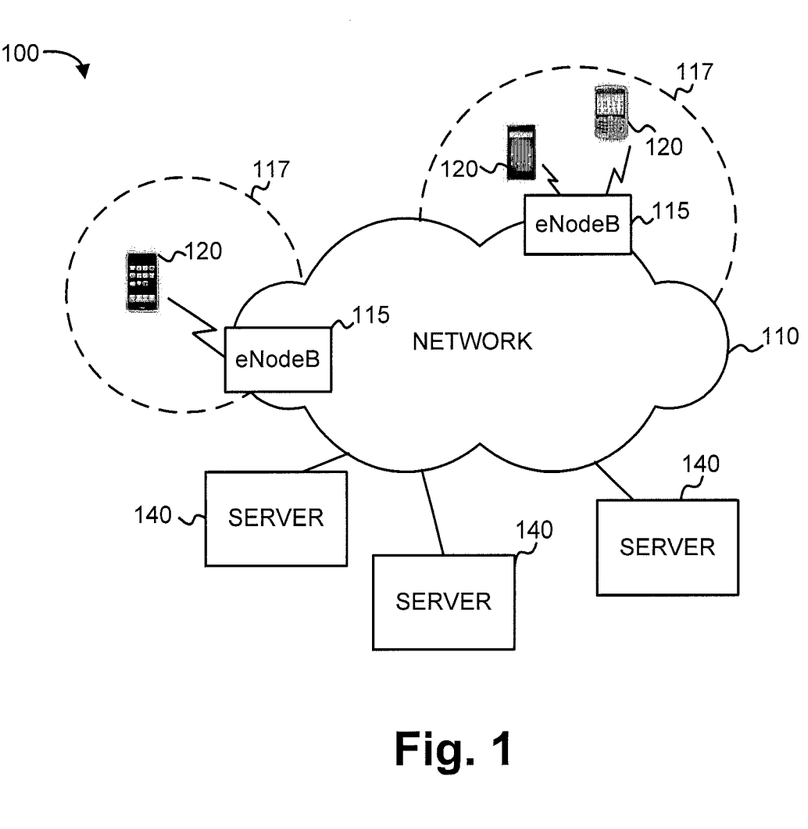
FIG. 1 is a diagram illustrating an example of a telecommunication system in which systems/methods described herein may be implemented.

FIG. 1 is a diagram illustrating an example of a telecommunication system 100 in which systems/methods described herein may be implemented. Telecommunication system 100 may include a network designed to connect customer devices, such as wireless mobile devices, to one another or to other resources. System 100 is particularly shown as including network 110, mobile devices 120, and server devices 140. Mobile devices 120 may wirelessly connect to network 110, such as via a radio interface. Server devices 140 may also connect to network 110. Server devices 140 may provide communication, connectivity, or other services to mobile devices 120 and network 110.

Network 110 may include any type of network or combination of networks, such as a local area network (LAN), a wide area network (WAN), a telephone network (e.g., the Public Switched Telephone Network (PSTN) or a cellular network), an intranet, the Internet, or a combination of networks. Network 110 may particularly include a wireless portion, through which mobile devices 120 connect. The wireless portion of network 110 may include access networks, which may provide the radio interfaces to mobile devices 120, and a core network portion, which may generally provide high capacity communication facilities that connect and manage the connectivity of mobile devices 120. In one implementation, wireless network 110 may include a number of possible access networks, such as the Universal Mobile Telecommunications System (UMTS) Terrestrial Radio Access Network and/or the evolved UMTS Terrestrial Radio Access Network (eUMTS). The access networks may include base stations that implement the radio interface to mobile devices 120. Base stations are particularly illustrated in FIG. 1 as Evolved NodeBs (eNodeB) 115. The core portion of wireless network 110 may be based on, for instance, the 3GPP Long Term Evolution (LTE) standard.

Mobile devices 120 that connect to a particular eNodeB 115 may be referred to herein as being in a particular wireless cell (i.e., in the cell of the particular eNodeB 115). Two cells 117 are illustrated in FIG. 1, in which each of the two cells corresponds to one of the eNodeBs 117.

Network 110 may also include a data portion, such an Internet Protocol (IP) packet-based network, which can be used to connect mobile devices 120 to server devices 140. Mobile devices 120 may thus connect through network 110 to server devices 140 (or to other mobile devices 120).

Mobile devices 120 may include devices designed to connect wirelessly to network 110. Mobile devices 120 may include devices such as mobile telephones, smartphones, electronic notepads, and/or personal digital assistants (PDAs). Mobile devices 120 may establish wireless communication sessions with eNodeBs 115. Mobile devices 120 may include the capability to display video, such as streaming video that is streamed through eNodeBs 115.

Server devices 140 may include devices that provide services to mobile devices 120 and/or other devices. Server device 140 may implement, for example, web servers or application servers with which mobile devices 120 may interact.

Although FIG. 1 shows example components of system 100, in other implementations, system 100 may include fewer components, different components, differently arranged components, or additional components than depicted in FIG. 1. Additionally or alternatively, one or more components of system 100 may perform the tasks described as being performed by one or more other components of system 100.

Figure 2:
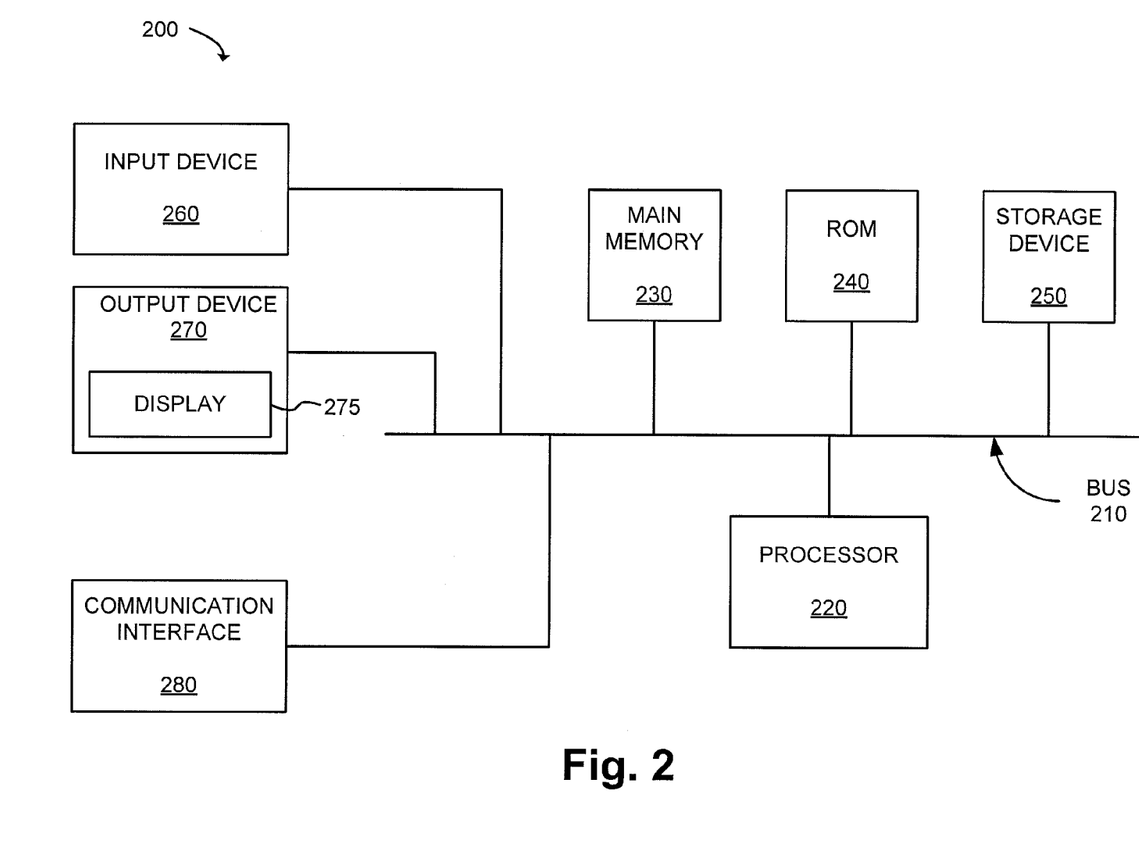
FIG. 2 is a diagram illustrating example components of a device shown in FIG. 1.

FIG. 2 is a diagram illustrating example components of a device 200, which may correspond to a mobile device 120 or a server device 140. As shown in FIG. 2, device 200 may include a bus 210, a processor 220, a main memory 230, a read only memory (ROM) 240, a storage device 250, an input device 260, an output device 270, and a communication interface 280.

Bus 210 may include a path that permits communication among the components of device 200. Processor 220 may include a processor, a microprocessor, or processing logic (e.g., an application specific integrated circuit (ASIC) or a field programmable gate array (FPGA)) that may interpret and execute instructions. Main memory 230 may include a random access memory (RAM) or another type of dynamic storage device that may store information and instructions for execution by processor 220. ROM 240 may include a ROM device or another type of static storage device that may store static information and instructions for use by processor 220. Storage device 250 may include a magnetic and/or optical recording medium and its corresponding drive, or a removable form of memory, such as a flash memory.

Input device 260 may include a mechanism that permits an operator to input information to device 200, such as a keyboard, a mouse, a button, a pen, a touch screen, voice recognition and/or biometric mechanisms, etc. Output device 270 may include a mechanism that outputs information to the operator, including a display, a light emitting diode (LED), a speaker, etc. When device 200 corresponds to a mobile device, output device 370 may particularly include a display 275. Communication interface 280 may include any transceiver-like mechanism that enables device 200 to communicate with other devices and/or systems. For example, communication interface 280 may include mechanisms for communicating with another network device.

As will be described in detail below, device 200 may perform certain operations relating to implementation of a virtual STB and/or supporting, by one or more servers, virtual STBs. Device 200 may perform these and other operations in response to processor 220 executing software instructions contained in a computer-readable medium, such as main memory 230. A computer-readable medium may be defined as a non-transitory memory device. The software instructions may be read into main memory 230 from another computer-readable medium, such as storage device 250, or from another device via communication interface 280. The software instructions contained in main memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 illustrates example components of device 200, in other implementations, device 200 may include additional, fewer, different, or differently arranged components than those illustrated in FIG. 2 and described herein.

In one implementation, mobile device 120 may execute a virtual STB application that may provide for a number of functions relating to viewing, controlling, and interacting with video content. The virtual STB application may communicate with server devices 140 to obtain information, such as configuration information, program guide data, user information, or other information related to the operation of the virtual STB application.

Figure 3:
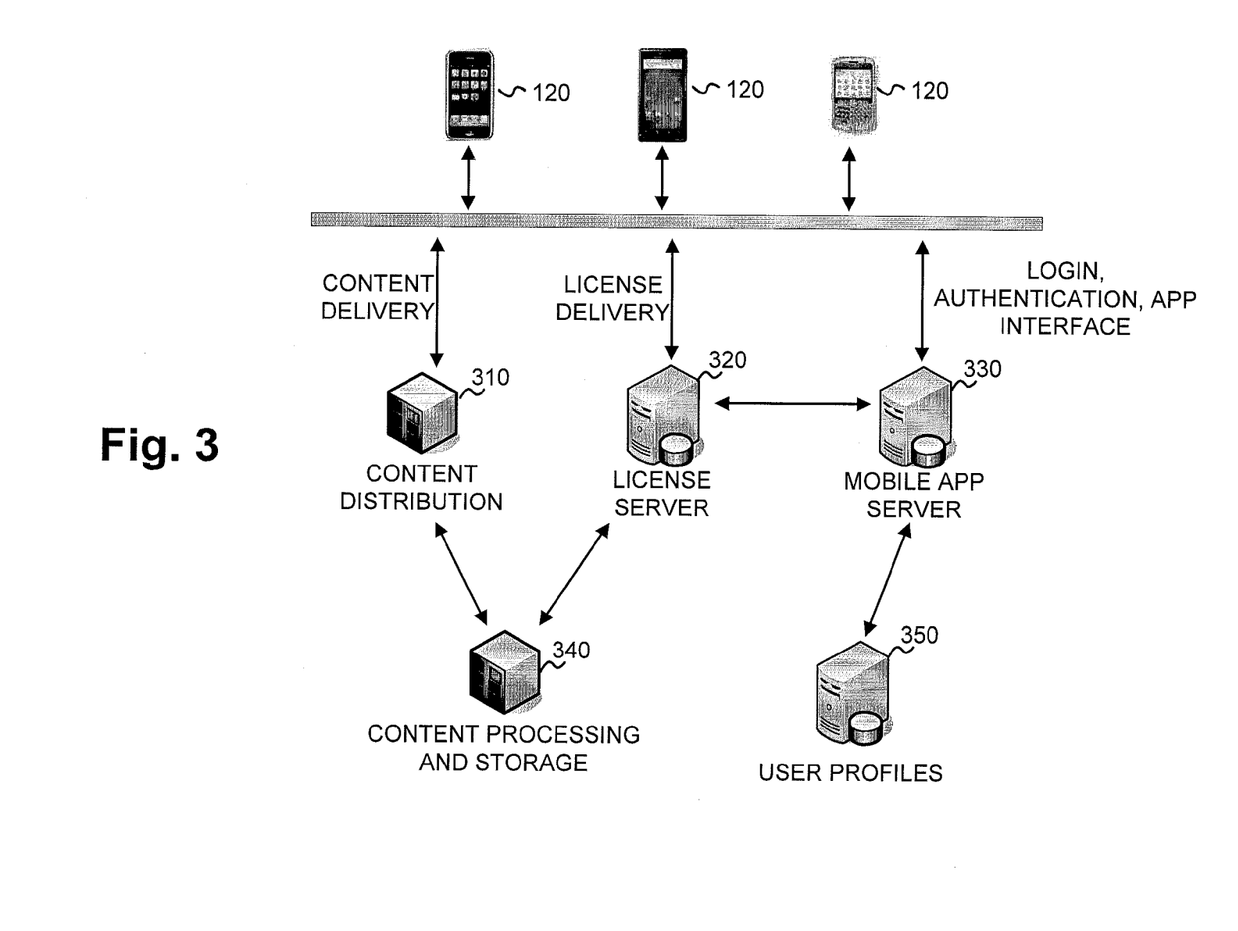
FIG. 3 is a diagram illustrating various server devices that may interact with a mobile device to implement a virtual set-top box (STB) application.

FIG. 3 is a diagram illustrating various server devices (e.g., server devices 140) that may interact with a mobile device 120 to implement the virtual STB application. The server devices may include a content distribution server 310, a license server 320, a mobile application server 330, a content processing and storage server 340, and a user profiles server 350.

Content distribution server 310 may include logic to distribute content, such as live streaming video broadcasts, to mobile devices 120. In one implementation, the distributed content may be broken into chunks of pre-defined or dynamically determined length video. The chunks can also be encrypted, potentially each with a different encryption key. Each video stream, or each chunk, may be associated with a link, such as a uniform resource locator (URL). Client devices 120 may access the video streams by requesting the corresponding link from content distribution server 310.

License server 320 may include logic to distribute licenses and/or decryption keys relating to video content that is to be distributed by content distribution server 310. License server 320 may, for example, receive license requests from mobile devices 120, contact mobile application server 330 to determine whether the requesting mobile device 120 is entitled to the license, and issue or deny the license request. In some implementations, when license server 320 determines that mobile device 120 is entitled to the license, license server 320 may respond to mobile device 120 by transmitting an index file that may include links to the content at content distribution server 320 and/or decryption keys needed to decrypt the content.

Mobile application server 330 may include logic to communicate with mobile devices 120 to provide server-side information relating to the STB application used by mobile devices 120. Mobile application server 330 may also provide initial login and authentication services to mobile devices 120. Mobile application server 330 may, for example, provide content listings of the currently available broadcasts, video-on-demand listings, widgets that provide integration with other applications and/or provide added functionality, advertisements, parental control features, and/or personal content storage or sharing services, etc. As will be described in more detail below, mobile application server 330 may also make decisions relating to the transmission of video streams as either multicast or unicast streams.

Content processing and storage server 340 may include logic to receive and encode video content. The video content may be received, for example, from a national or local television broadcast provided by the entity that provides the virtual STB application. Content processing and storage server 340 may segment the received video into chunks for storage by content distribution server 310. Content processing and storage server 340 may also encrypt the chunks and provide the corresponding decryption keys to content distribution server 310 or license server 320.

User profiles server 350 may store information relating to accounts of users of mobile devices 120. User profiles server 350 may store, for example, information relating to services to which users have subscribed, preference information of the users, information relating to the type of mobile devices 120 of the users, or other information relating to the users. User profiles server 350 may provide the user profile information to mobile application server 330 as part of the implementation of the virtual STB application.

Although FIG. 3 shows example various server devices that may interact with mobile devices 120, in other implementations, the server devices may include different server devices, fewer server devices, or additional server devices than depicted in FIG. 3. Additionally, each of the server devices may be implemented as one or more, possibly distributed, computing devices.

Figure 4:
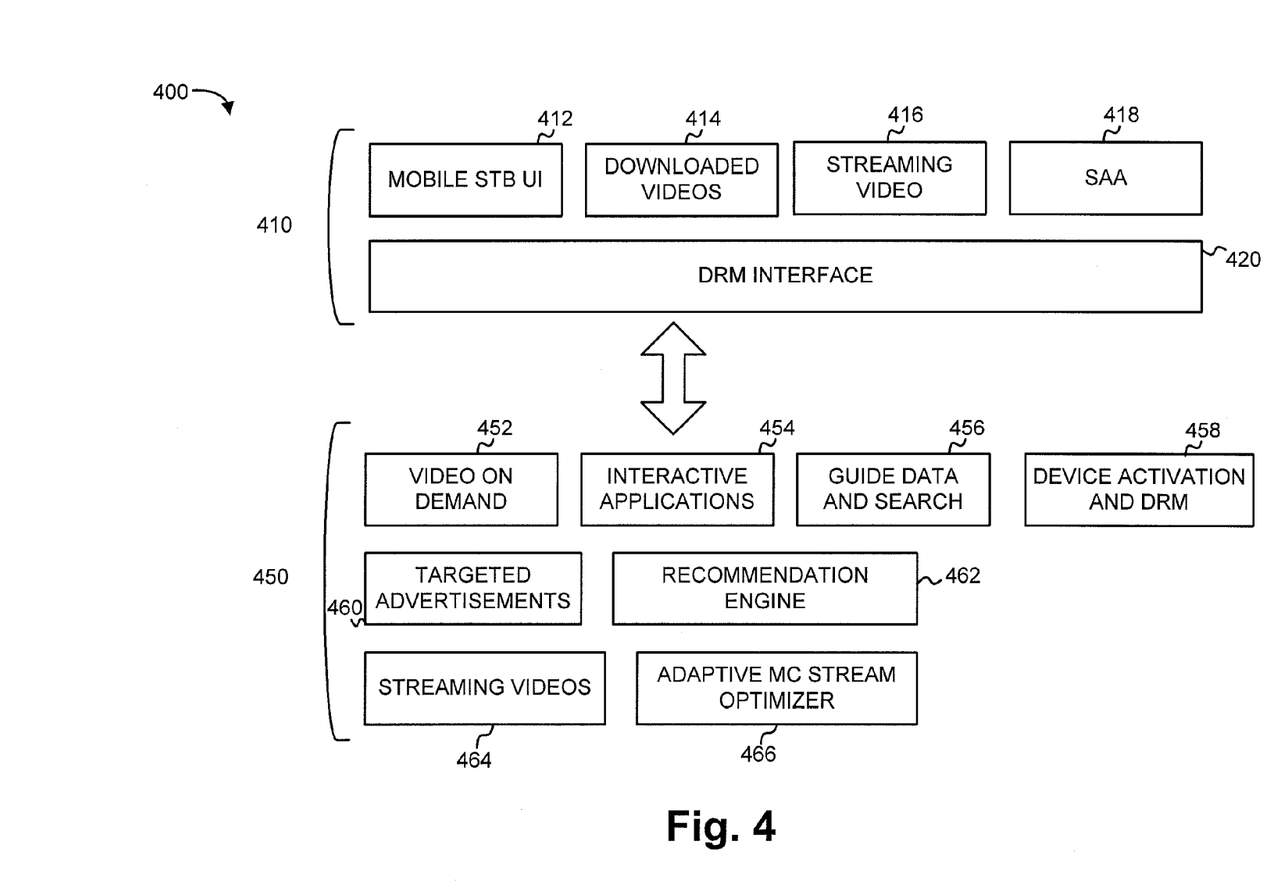
FIG. 4 is a diagram illustrating an example of components, such as software components, that may be used to implement the virtual STB application.

FIG. 4 is a diagram illustrating an example of functional components 400, such as software components, that may be utilized to implement the virtual STB application. Components 400 may include client-side components 410, which may be implemented in an application executed at mobile device 120, and server-side components 450, which may be implemented by one or more of server devices 140 (e.g., by content distribution server 310, license server 320, mobile application server 330, content processing and storage server 340, and/or user profiles server 350).

Client-side components 410 may include a mobile STB user interface ("UI") 412, a downloaded videos component 414, a streaming videos component 416, a SAA (security, authentication, and authorization) component 418, and a digital rights management (DRM) interface 420.

STB UI 412 may include logic to display and receive user interaction with the visual interface of the virtual STB application. STB UI 412 may, for example, present an interactive programming guide to the user, receive selections relating to the interactive program guide, display a search interface for searching viewable content, display user recommendations, and handled the display for custom widgets or other applications that are installed within the framework of the virtual STB application.

Downloaded videos component 414 may include logic to handle the selection and downloading of video content. Downloaded video content may include videos that are available to view when mobile device 120 is offline. Downloaded video content may be video content that has been purchased by the user or rented by the user.

Streaming video component 416 may include logic to stream videos, such as real time "live" television, to the user. Streaming video component 416 may interact with license server 320 and/or mobile application server 330 to obtain initial permission to view a streaming video. The license obtained from license server 320 may include a URL that links to one or more video chunks stored at content distribution server 310. Video chunks may be streamed from content distribution server 310, decoded by streaming video component 416, and presented, through STB UI 412, to the user.

SAA component 418 may perform functions relating to the security and authenticity of mobile device 120. SAA component 418 may, for example, communicate with mobile application server 330, when the virtual STB application is initially started, to perform an initial login procedure to authenticate the user of mobile device 120. In one implementation, once a user is initially authenticated, via, for example, submission of a password and login identifier (or device identifier), a token may be generated by mobile application server 330 and transmitted to SAA component 418 for later content retrieval. The token may be generated using, for example, a hash based on a number of parameters, such the user login identifier, a device identifier unique to mobile device 120, an expiration time, and potentially other information such as user profile information. Later requested content, such as a video stream requested from content distribution server 310, may be authenticated using the token.

In one implementation, policies, associated with mobile device 120 and/or the user's account, may be embedded within the token. The policy information may be used to ensure that appropriate actions, such as appropriate content licensing actions, be taken by server devices 140. The token may be encrypted so that only authorized server devices 140 may be able to read the policy information embedded in the token.

DRM interface 420 may perform functions relating to digital rights management of content received from content distribution servers 310. DRM interface 420 may include a secure content player. DRM interface 420 may also provide a framework through which different DRM solutions, such as third party DRM solutions, may be implemented.

Server-side components 450 may include video on demand component 452, interactive applications component 454, guide data and search component 456, device activation and DRM component 458, targeted advertisements component 460, recommendation engine component 462, streaming videos component 464, and adaptive multicast ("MC") stream optimizer 466.

Video on demand component 452 may respond to requests from mobile devices 120 to receive video on demand at mobile device 120. Video on demand component 452 may, for example, issue notifications to user profiles server 350 indicating that the user's account should be charged for the video and may issue notification to license server 320 indicating that mobile device 120 is authorized to download the requested video.

Interactive applications component 454 may include one or more elements that interact with the user of mobile device 120. For example, interactive applications component 454 may provide interactive games, social media, customizable content, remote control of other mobile devices, or other data/applications in which a user may be interested.

Guide data and search component 456 may provide interactive programming guide information to mobile device 120. The programming guide may display currently available television broadcasts, video-on-demand broadcasts, or other currently available content. In some implementations, the user may be able to interact with and schedule operations relating to (e.g., schedule recording of content) upcoming content.

Device activation and DRM component 458 may communicate with SAA 418 to initially activate mobile device 120. Device activation and DRM component 458 may also provide the server-side logic for implementing DRM for the content that is to be viewed by the virtual STB application at mobile device 120. In one implementation, device activation and DRM component 458 may detect DRM violations or policy violations (e.g., a user requesting too many videos in a predetermined time period) based on data collected in the interaction of mobile devices 120 with server devices 140. Based on the collected data, typical usage patterns may be modeled, which may be used to flag abnormal or abusive usage. In this situation, further investigation or analysis can be performed to identify the relationship of the content viewed at mobile device 120 (e.g., is the content related or random) or relationships between the timing of when content is viewed at mobile device 120. Based on the analysis, device activation and DRM component 458 may, for example, reduce the bandwidth allocated to a mobile device 120, restrict the video content that can be viewed by mobile device 120, reduce the quality of the video content, etc.

Targeted advertisements component 460 may provide advertisements to mobile devices 120. Target advertisements component 460 may select the advertisements to provide based on information relating to the user, such as information from user profiles server 350 or information derived from other sources (e.g., actions of the user).

Recommendation engine 462 may make recommendations of content that is determined to potentially be interesting to the user, such as movies or other content. Recommendation engine 462 may make the recommendations based on information relating to the user, such as information from user profiles server 350.

Streaming videos component 464 may provide logic to stream content, such as live (e.g., broadcast) television, to mobile devices 120. Streaming videos component 464 may be implemented by a combination of one or more of content distribution server 310, license server 320, and mobile application server 330. Streaming videos component 464 may control the streaming of video from content distribution server 310 to mobile devices 120.

Adaptive MC streaming optimizer 466 may perform control functions relating to dynamically determining whether a particular video stream should be transmitted by eNodeBs 115 as multicast streams or as unicast streams. Adaptive MC streaming optimizer 466 may, for instance, analyze usage patterns of mobile devices 120 that are streaming videos to determine video streams that are good candidates for multicast. The operation of adaptive MC streaming optimizer 466 will be described in more detail below with reference to FIGS. 6-11.

Although FIG. 4 shows example client-side components 410 and server-side components 450, in other implementations, client-side components 410 and server-side components 450 may include different, fewer, or additional components than depicted in FIG. 4. Additionally or alternatively, one or more client-side or server-side components 410 or 450 may perform the tasks described as being performed by one or more other components.

Figure 5:
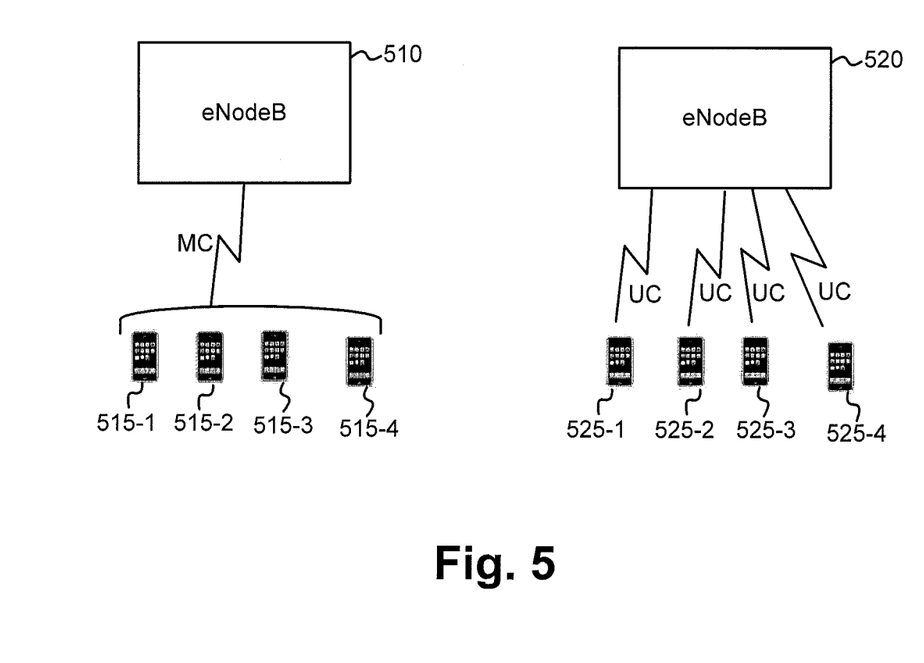
FIG. 5 is a diagram illustrating examples of unicast and multicast transmission for a radio interface of a network.

FIG. 5 is a diagram illustrating examples of unicast and multicast transmission for the radio interface of network 110. Two example base stations, eNodeB 510 and eNodeB 520 are shown in FIG. 5. Assume that eNodeB 510 and eNodeB 520 are both part of the same wireless network (e.g., an LTE network that provides service to mobile devices 120). Further, assume four mobile devices 515-1 through 515-4 are connected to eNodeB 510 and four mobile devices 525-1 through 525-4 are connected to eNodeB 520.

Assume mobile devices 515-1, 515-2, 515-3, and 515-4 are receiving a first streaming video program, such as a television broadcast, as a multicast transmission, in which a single radio channel is dedicated to the television broadcast. Each of mobile devices 515-1 through 515-3 may be controlled to receive the first video program using the single radio channel (labeled as MC in FIG. 5). Thus, the radio channel may be shared. Advantageously, the radio frequency spectrum of the cell corresponding to eNodeB 510 may be efficiently allocated.

For eNodeB 520, in contrast, assume that each of mobile devices 525-1 through 525-4 is receiving a streaming broadcast over a "normal" unicast channel (UC) that is dedicated to each of mobile devices 525-1 through 525-4. This may be desirable in situations in which, for example, each mobile device 525-1 through 525-4 is viewing a video stream that is not being viewed by any other mobile device connected to eNodeB 520.

Figure 6:
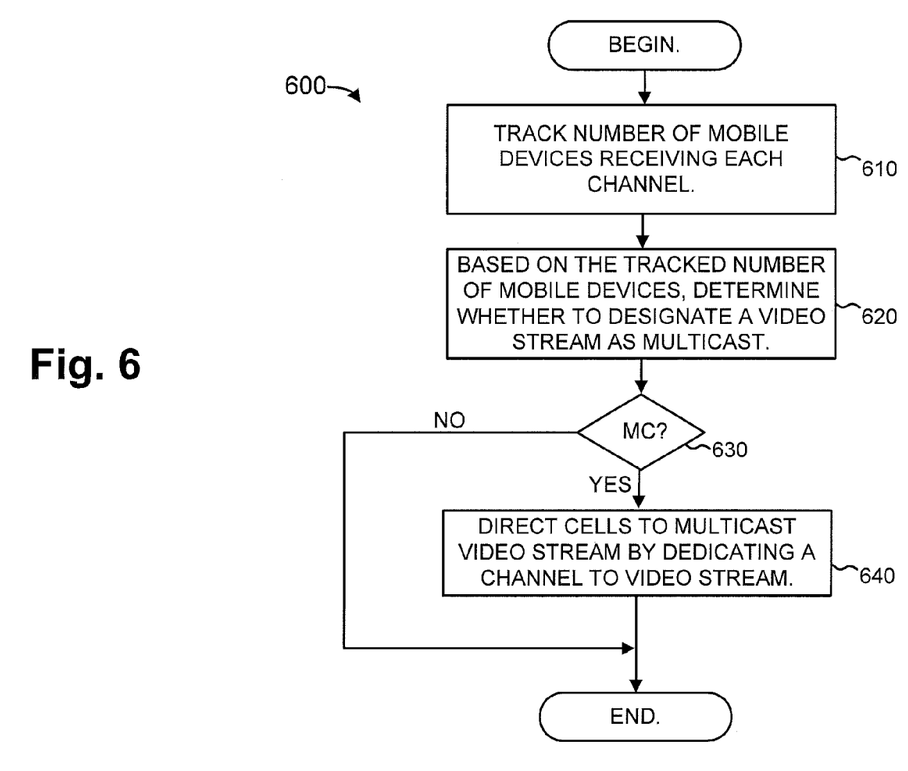
FIG. 6 is a flow chart illustrating an example process for multicast video streaming in a wireless network.

FIG. 6 is a flow chart illustrating an example process 600 for multicast video streaming in a wireless network. The operations of FIG. 6 may be performed by, for example, adaptive MC streaming optimizer 466 of server devices 140, which may control and/or receive information from elements of network 110, such as eNodeBs 115. For process 600, assume that, when a video stream is designated as a multicast stream, all eNodeBs 115 that are in the particular wireless network may be required to broadcast the video stream.

Process 600 may include tracking the number of mobile devices 120 receiving each video stream (block 610). Adaptive MC streaming optimizer 466 may, for example, continuously track the number of mobile devices 120 that are receiving each video stream. In some implementations, the tracked video streams may only be "live" video streams, such as video streams that represent broadcast television stations. On demand video streams, in contrast, may only be applicable for multicast if a number of users are at the same point in the video stream.

Figure 7:
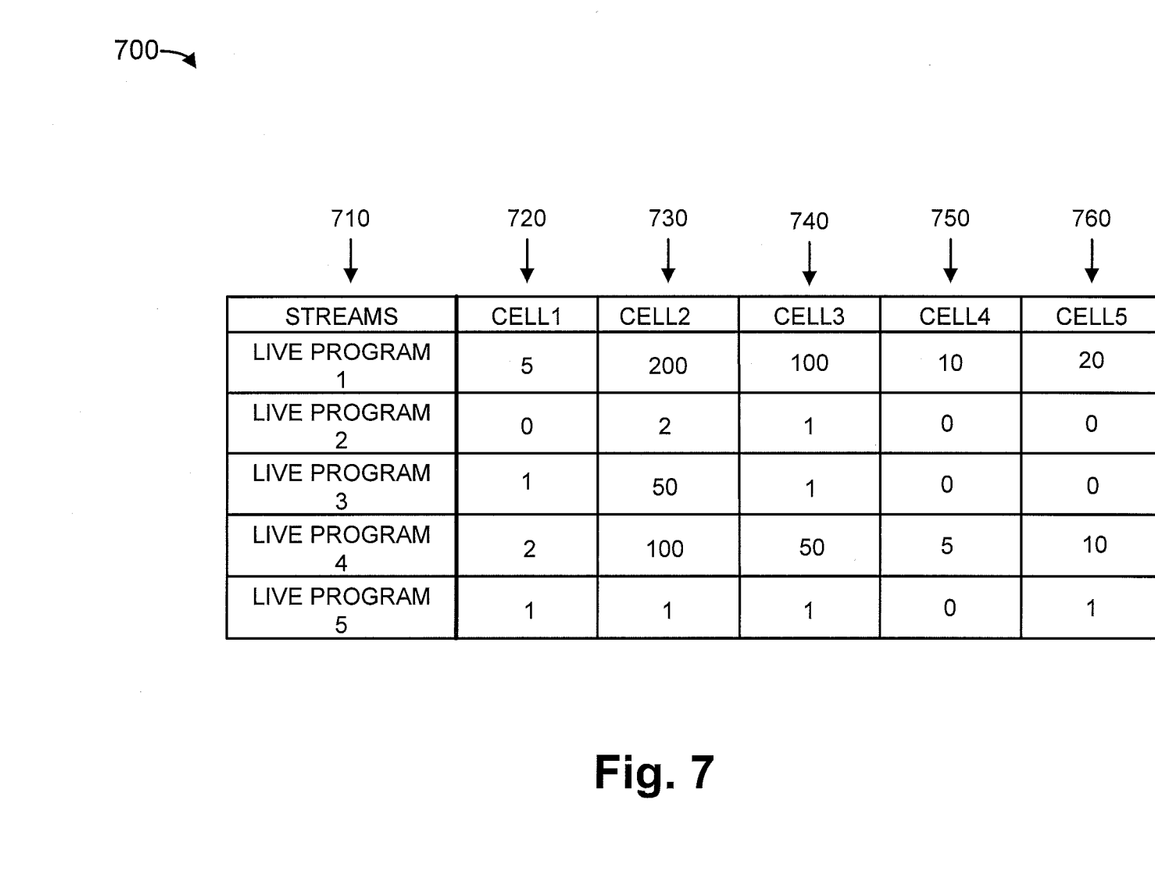
FIG. 7 is a diagram illustrating an example data structure that may be maintained for determining the number of mobile devices receiving video streams.

FIG. 7 is a diagram illustrating an exemplary data structure 700 that may be maintained by adaptive MC streaming optimizer 466 in tracking the number of mobile devices receiving each video stream. Data structure 700 may include a table that includes a streams field 710, which may identify the video stream corresponding to each row. The video streams in streams field 710 may include, for example, an identification of a television broadcast or other broadcast in which a number of users may potentially view the video stream simultaneously. Data structure 700 may additionally include a column for each eNodeB that is being tracked as part of the multicast determination. Five eNodeBs 115 are particularly illustrated in data structure 700, labeled as a cell1 field 720, a cell2 field 730, a cell3 field 740, a cell4 field 750, and a cell5 field 760. The value in fields 720-760 may include, for each video stream identified in stream field 710, an indication of the number of mobile devices 120 that are currently viewing the video stream. For the video stream "live program 1," for instance, five mobile devices in cell1 are viewing the video stream, 200 in cell2, 100 in cell3, 10 in cell4, and 20 in cell5.

Although data structure 700 includes an example list of fields, in other implementations, data structure 700 may include fewer fields, additional fields, or different fields.

Referring back to FIG. 6, process 600 may further include determining, based on the tracked number of mobile devices receiving each channel, whether to designate a video stream as multicast (block 620). This determination may be made based on a calculation of the bandwidth efficiency of directing all the cells to multicast a video stream relative to delivering the video stream to all requesting mobile devices 120 via "normal" unicast transmission. In one implementation, this determination may be made by comparing the total number of requests for a video stream, across all cells, to the number of cells (e.g., eNodeBs 115). If the total number of requests is greater than the total number of cells, it may be more efficient to multicast the video stream. As another example, the determination may also take into account the remaining channel capacity of each cell. For instance, if a number of mobile devices 120 in one particular cell are simultaneously streaming a video but no other cells include mobile devices 120 that are streaming that video stream, it may still be beneficial to designate the video stream as multicast if the particular cell is nearing its channel capacity limit and the other cells have ample spare capacity.

As an example of the operation of block 620, consider data structure 700. In data structure 700, "live program 1" may be particularly efficient for multicasting as 335 mobile devices are viewing the video stream and multicasting the video stream may only require five channels (one for each cell). For "live program 2," however, only three mobile devices 120 are currently viewing the video stream. Transmitting this video stream as a multicast transmission may use five channels (e.g., one for each cell) while transmitting the video stream via unicast may only require three channels (one for each mobile device). Accordingly, for "live program 2," unicast transmission may be the more bandwidth efficient solution. For "live program 3," although a number of cells have no mobile devices viewing the video stream, the cell corresponding to cell2 field 730 has 50 mobile devices viewing the video stream. In this case, by considering the tradeoff that there are a large number of viewers in cell2, it may still be desirable to use multicast even though the dedicated channels for cell4 and cell5 may be "wasted" when the multicast is started.

As further shown in FIG. 6, when the determination of block 620 is to designate a video stream as a multicast video stream (block 630—YES), each of the cells (e.g., eNodeBs 115) in the wireless portion of network 110 may dedicate a channel to the video stream (block 640). In this case, adaptive MC streaming optimizer 466 may, for example, send a message to eNodeBs 115 (or to another element in network 110 that controls eNodeBs 115) directing eNodeBs 115 to dedicate a channel to the video stream. The channel that is used by each eNodeB 115 may be stored by mobile application server 330 (e.g., by adaptive MC streaming optimizer 466) or by another element in network 110.

In some implementations, it may be feasible and/or technically possible, in network 110, to control multicasting on a per-cell basis. Thus, a video stream may be enabled for multicasting in one cell but delivered via unicast in another cell. In this situation, the determination in block 620 may be made on a per-cell basis in which multicasting may be used whenever the number of viewing mobile devices 120 in a cell is above a threshold level. Assume, for example, that the threshold level is two. Referring to data structure 700, in this case, for "live program 3," this video stream may be multicast on a dedicated channel in cell2 (cell2 field 730) and unicast in the other cells. For "live program 1," however, multicast may be performed for every cell.

Video streams that are available for streaming by mobile devices 120 may be referenced by a link, such as a uniform resource locator (URL), that is passed to mobile devices 120 from mobile application server 330. The URL may refer to, for example, license server 320 or content server 310, and may be used by mobile device 120 to request streaming of video content.

Figure 8A:
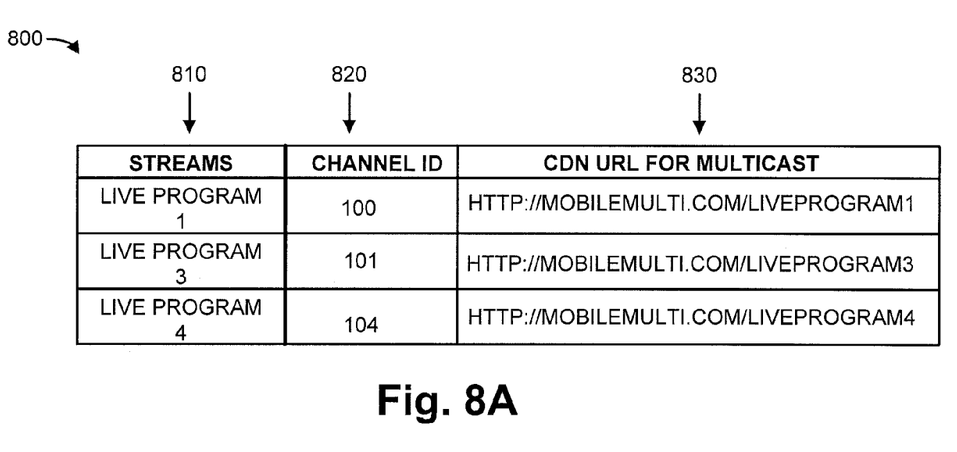
FIGS. 8A and 8B are diagrams of example data structures that may store links to video streams that may be streamed by mobile devices.
Figure 8B:
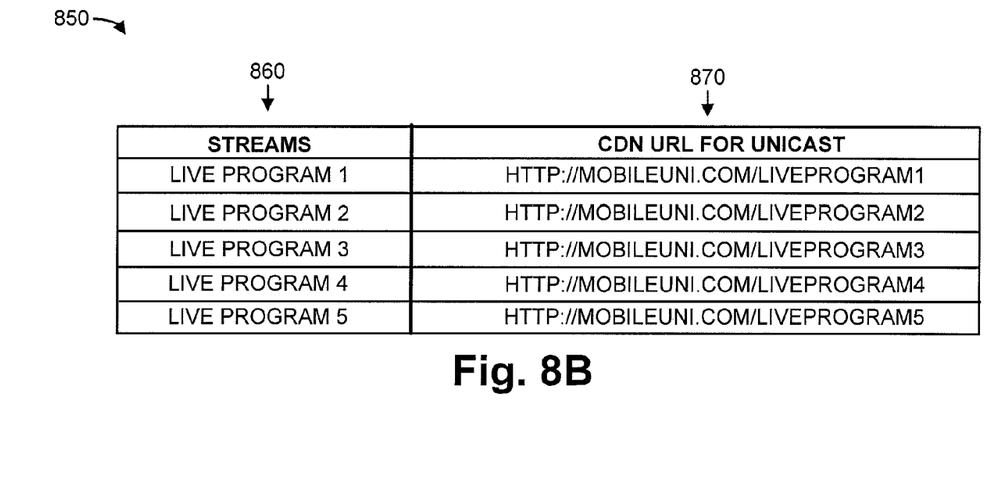

FIGS. 8A and 8B are diagrams of example data structures that may store links to video streams that may be streamed by mobile devices 120.

In FIG. 8A, data structure 800 may include a table that stores video streams, such as live video broadcasts, that have been determined (such as in block 620) to be transmitted via multicast. Data structure 800 may include a streams field 810, a channel identifier (ID) field 820, and a URL field 830. Streams field 810 may identify the video stream corresponding to each row. The video streams in streams field 810 may include, for example, an identification of a television broadcast or other broadcast. Channel ID field 820 may include an identification of a particular channel, such as a channel in the wireless spectrum of network 110. The value in channel ID field 820 may include, for example, a frequency range or label that identifies a particular channel in the wireless network (e.g., an LTE network). Channel ID field 820 is particularly illustrated as including example channel labels "100," "101," and "104," which may refer to the dedicated channels on which the video streams "live program 1," "live program 3," and "live program 4" are respectively broadcast. URL field 830 may include a URL or other link that references the content at license server 320 or content server 310. Mobiles devices 120 may access the link to begin streaming of a particular video stream.

In FIG. 8B, data structure 850 may include a table that stores links corresponding to the unicast transmission of video streams. In one implementation, all the video streams that are eligible for streaming may be given a unicast link. Data structure 850 may include a streams field 860 and a URL field 870. Streams field 860 may identify the video stream corresponding to each row. The video streams in streams field 860 may include, for example, an identification of a television broadcast or other broadcast, in which a number of users may potentially view the video stream simultaneously. URL field 870 may include a URL or other link that references the content at license server 320 or content server 310. Mobiles devices 120 may access the link to begin streaming of a particular video stream.

Although data structures 800 and 850 include an example list of fields, in other implementations, data structures 800 and 850 may include fewer fields, additional fields, or different fields.

Figure 9:
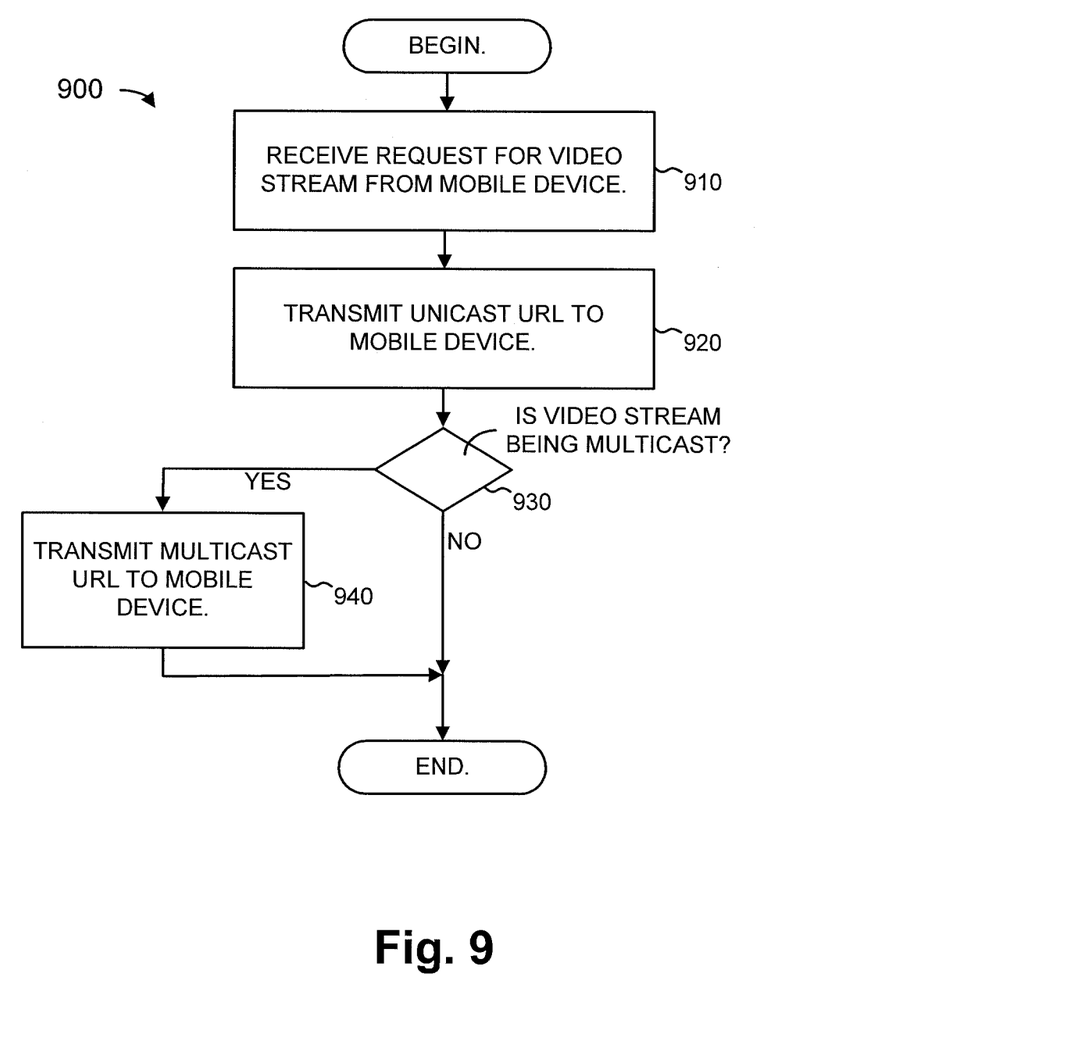
FIG. 9 is a flow chart illustrating an example process for multicasting video streams.

FIG. 9 is a flow chart illustrating an example process 900 for multicasting video streams. Process 900 may be performed, for example, by mobile application server 330.

At some point, a user of mobile device 120 may decide to view video using the virtual STB application. Mobile device 120 may submit a request to view the video to application server 330. Process 900 may include receiving the request for the video stream from mobile device 120 (block 910). The unicast URL corresponding to the requested video stream may be transmitted to mobile device 120 (block 920). For example, mobile application server 330 may lookup the unicast URL for the video stream from data structure 850 and may transmit the looked-up URL to mobile device 120.

Process 900 may further include determining whether the video stream is one that is being multicast in the wireless portion of network 110 (block 930). The determination may be made by, for example, looking up the video stream in data structure 800 to determine whether the video stream is present in data structure 800. When the video stream is determined to be a multicast video stream, (block 930—YES), the URL corresponding to the multicast data stream, such as the URL stored in URL field 830, may be transmitted to mobile device 120 (block 940) along with cell channel ID 820.

Figure 10:
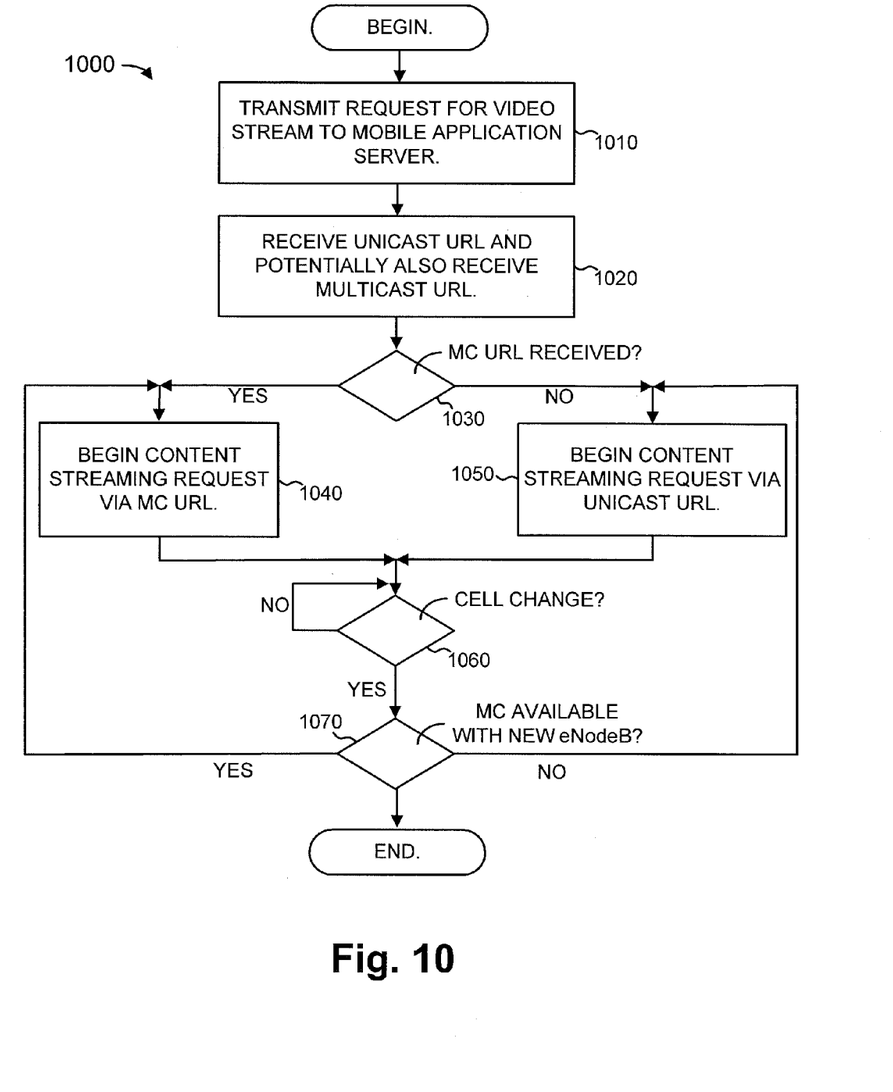
FIG. 10 is a flow chart illustrating an example process for receiving, by a mobile device, multicast and unicast video streams.

FIG. 10 is a flow chart illustrating an example process 1000 for receiving, by mobile device 120, multicast and unicast video streams through the virtual STB application.

Process 1000 may include transmitting a request for a video stream to mobile application server 330 (block 1010). As discussed with respect to FIG. 9, in response to the request, mobile application server 330 may respond with URLs that link to resources from which mobile device 120 can obtain the video. Mobile device 120 may receive a URL corresponding to the unicast version of the video stream, and if one was sent, a URL corresponding to the multicast version of the video stream (block 1020). As mentioned previously, not all video streams may be multicast. For those that are not, only the unicast URL may be received.

Process 1000 may further include determining whether a multicast URL was received (block 1030). Whether a particular URL is a multicast URL may be determined, for example, by the form or content of the URL, such as by the host portion of the URL. When a multicast URL is received, mobile device 120 may access the URL and begin streaming the video based on the URL (block 1040). In one implementation, the URL may link to a resource, such as one hosted by license server 320 or content distribution server 310, that provides additional information relating to how mobile device 120 is to receive the multicast video stream. The link may, for instance, include a link to a resource that includes the channel ID on which the video stream is being broadcast. Mobile device 120 may then connect to the indicated channel though the handset OEM (original equipment manager) interface. Alternatively, the URL itself may contain the channel ID to which mobile device 120 is to connect.

Process 1000 may include, when a multicast URL is not received (block 1030—NO), beginning content streaming using the unicast URL (block 1050). Mobile device 120 may access the unicast URL to begin streaming of the video. The video may be streamed over the current channel to which mobile device 120 is connected.

At some point, the current cell to which mobile device 120 is connected may change (block 1060). For example, mobile device 120 may move from the coverage area of one eNodeB 115 to another. In response to a cell change (block 1060—YES), mobile device 120 may determine whether the new eNodeB supports multicasting of the video stream being viewed (block 1070). Mobile device 120 may determine, for example, whether the new eNodeB supports multicasting based on whether the multicast channel ID, in the new eNodeB, is providing a multicast stream of the desired video stream.

When the new eNodeB supports multicasting, (block 1070—YES), mobile device 120 may stream the desired video stream using the multicast URL (if available) (block 1040). If, however, the new eNodeB does not support multicasting, (block 1070—NO), mobile device 120 may stream the desired video stream using the unicast URL (block 1050).

Mobile devices 120 may include different types of mobile devices that have different display sizes and video processing capabilities. Additionally, in some situations, a mobile device 120 may be in a reception area that does not have very good signal strength and may thus not support a high bandwidth video stream. Accordingly, it may be desirable to be able to adaptively change the quality of the video streams, such as by changing the encoded bit rate of the video stream.

In one implementation, mobile application server 330 may offer a number of different delivery bit rates for each multicast video stream. Mobile device 120 (or alternatively, one of server devices 140) may choose the bit rate appropriate for the hardware and/or network connection quality of the device.

Figure 11:
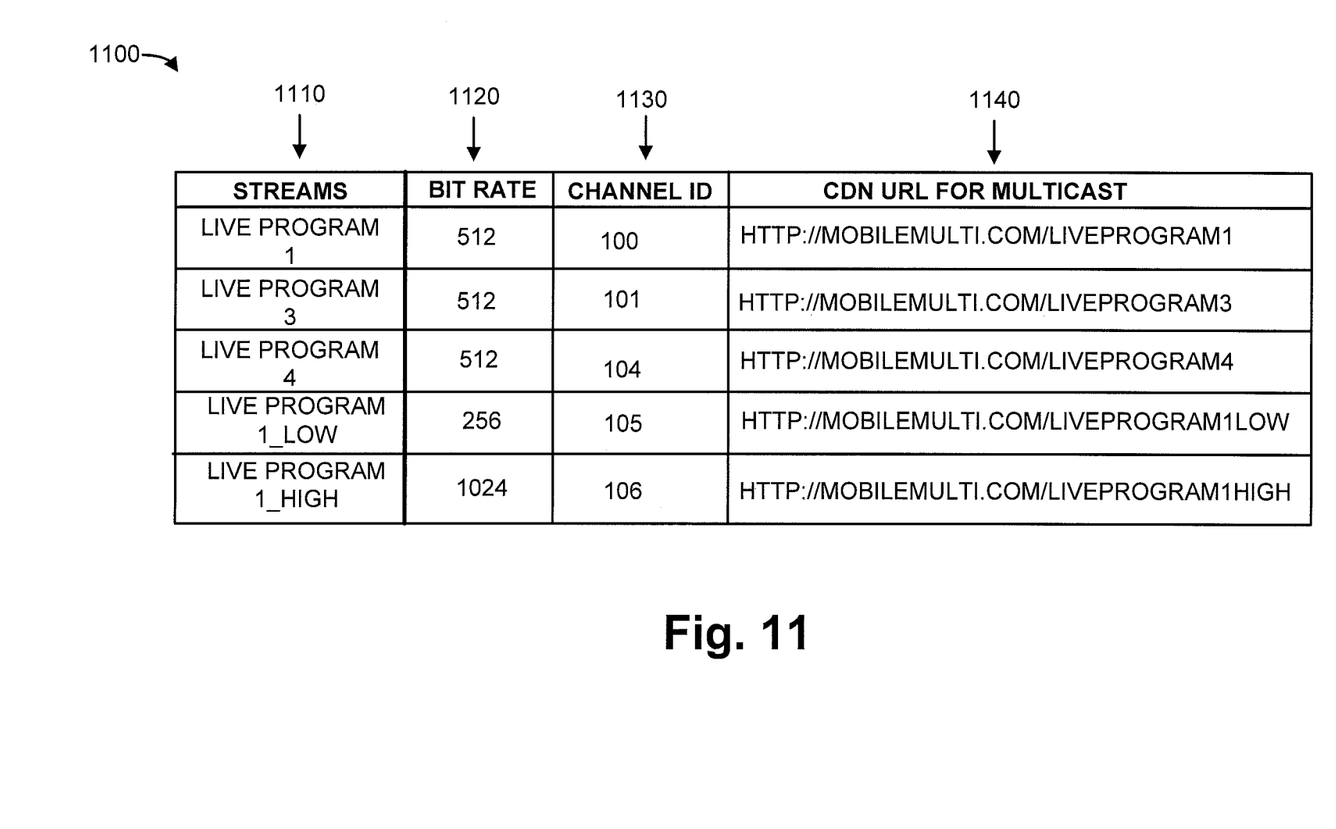
FIG. 11 is a diagram of an example data structure that may store links to video streams, including different bit rate streams, that may be streamed to mobile devices.

FIG. 11 is a diagram of an example data structure 1100 that may store links to video streams, including different bit rate streams, that may be streamed to mobile devices 120. In FIG. 11, data structure 1100 may include a table that stores video streams, such as live video broadcasts, that have been determined (such as in block 620, FIG. 6) to be transmitted via multicast. Multiple different versions of a video stream may be implemented in data structure 1100, in which each version may be at a different bit rate.

Data structure 1100 may include a streams field 1110, a bit rate field 1120, a channel ID field 1130, and a URL field 1140. Streams field 1110 may identify the video stream corresponding to each row. The video streams in streams field 1110 may include, for example, an identification of a television broadcast or other broadcast. Bit rate field 1120 may contain the encoding bit rate at which the video stream was encoded. A number of example encoding rates, such as rates given in kilo-bits-per-second (kbps) are shown (i.e., 256 kbps, 512 kbps, and 1024 kbps). The video stream "live program 1," for instance, is shown as having a 512 kbps version (the first row of data structure 1100), a 256 kbps version (the fourth row of data structure 1100), and a 1024 kbps version (the fifth row of data structure 1100).

Channel ID field 1130 may include an identification of particular channel, such as a channel in the wireless spectrum of network 110. The value in channel ID field 1130 may include, for example, a frequency range or label that identifies a particular channel in the wireless network (e.g., an LTE network). Channel ID field 1130 is particularly illustrated as including example channel labels "100," "101," "104," "105," and "106," which may refer to the dedicated channels on which the video streams "live program 1," "live program 3," and "live program 4," "live program 1_low," and "live program 1_high," are respectively broadcast. The video stream "live program 1," in particular, is illustrated as being broadcast on three different channels, depending on the bit rate: channel "100" (bit rate 512), channel "105" (bit rate 256), and channel "106" (bit rate 1024).

URL field 1140 may include a URL or other link that references the content at license server 320 or content server 310. Mobiles devices 120 may access the link to begin streaming of a particular video stream. Different bit rate streams of the same video program may include different links in URL field 1140. In one implementation, mobile application server 330 may transmit all of the available multicast links, for a particular video stream, to a requesting mobile device 120. For example, in block 940 (FIG. 9), for the video stream "live program 1," the URLs in URL field 1140 from the first, fourth, and fifth rows in data structure 1100 may be transmitted to mobile device 120. Mobile device 120 may then choose the most appropriate URL based on the bit rates. Alternatively, mobile application server 330 may decide on an appropriate bit rate for mobile device 120 and then transmit the corresponding multicast URL to mobile device 120.

As described above, mobile devices may include a virtual STB application that may provide a number of features relating to view and controlling content. The virtual STB application may stream certain video streams via a multicast connection in which multiple mobile devices in a cell connect to the same radio channel. In this manner, bandwidth in the wireless interface can be saved.

It will also be apparent that aspects described herein may be implemented in many different forms of software, firmware, and hardware in the implementations illustrated in the figures. The actual software code or specialized control hardware used to implement aspects described herein is not intended to limit the scope of the invention. Thus, the operation and behavior of the aspects were described without reference to the specific software code—it being understood that software and control hardware can be designed to implement the aspects based on the description herein.

While series of blocks have been described in FIGS. 6, 9, and 10, the order of the blocks may vary in other implementations. Also, non-dependent blocks may be performed in parallel.

Even though particular combinations of features are recited in the claims and/or disclosed in the specification, these combinations are not intended to limit the invention. In fact, many of these features may be combined in ways not specifically recited in the claims and/or disclosed in the specification.

Further, certain aspects described herein may be implemented as "logic" or as a "component" that performs one or more functions. This logic or component may include hardware, such as an application specific integrated circuit or a field programmable gate array, or a combination of hardware and software.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise. The scope of the invention is defined by the claims and their equivalents.

What is claimed is:

1. A method implemented by one or more computing devices, the method comprising:
    tracking, by one or more computing devices, a quantity of videos that are being streamed, over a wireless interface, of a wireless network and to mobile devices, at any particular time;
    determining, by the one or more computing devices, based on the tracked quantity of videos, a number of requests for the one or more of the videos, and a quantity of cells in the wireless network, whether to dedicate a radio channel, of at least one cell in the wireless network, to streaming a first of the videos;
    directing, in response to the determination, a base station corresponding to the at least one cell in the wireless network to dedicate the radio channel to stream the first video; and
    transmitting, by the one or more computing devices and in response to a request, from a mobile device, for the first video, an identification of the dedicated radio channel so that the mobile device can receive the first video as a streaming video over the dedicated radio channel.

2. The method of claim 1, where determining whether to dedicate the radio channel includes determining to dedicate the radio channel of all cells in the wireless network.

3. The method of claim 1, where the wireless network includes a Long Term Evolution (LTE) standard wireless network.

4. The method of claim 1, where the videos being streamed include television broadcasts.

5. The method of claim 1, where determining whether to dedicate a radio channel to streaming the first video includes comparing a total quantity of requests for the first video to the quantity of cells in the wireless network.

6. The method of claim 1, further comprising:
    allowing a plurality of mobile devices to simultaneously connect to the dedicated radio channel to simultaneously receive the first video.

7. The method of claim 1, where the identification of the dedicated radio channel is made via a multicast uniform resource locator (URL) transmitted to the mobile device.

8. The method of claim 1, further comprising:
    transmitting a unicast uniform resource locator (URL) to the mobile device.

9. The method of claim 1, where the request from the mobile device is received from a virtual set-top box (STB) application of the mobile device.

10. The method of claim 1, further comprising:
    storing a plurality of versions of the first video, where each of the plurality of versions of the first video corresponds to a different quality of the first video, and where the determination to dedicate the radio channel to the first video includes dedicating a separate radio channel to each of the plurality of versions of the first video.

11. A system comprising:
    one or more processors; and
    a memory to store instructions that cause the one or more processors to:
        store a quantity of videos that are being streamed, over a wireless interface, of a wireless network and to mobile devices, at any particular time;
        determine, based on the stored quantity of videos, a number of requests for one or more of the videos, and a quantity of cells in the wireless network, whether to dedicate a radio channel, of at least one cell in the wireless network, to multicast stream one or more of the videos that are being streamed;
        direct, in response to the determination, a base station corresponding to the at least one cell in the wireless network to dedicate the radio channel to stream a first one of the videos;
        store, for each of the videos that are determined to be multicast streamed, a multicast link; and
        transmit, in response to a request from a mobile device for one of the multicast streamed videos, the corresponding multicast link, where the multicast link is used by the mobile device to initiate streaming of the corresponding video from the dedicated radio channel.

12. The system of claim 11, where the instructions that cause the one or more processors to determine whether to dedicate the radio channel further includes instructions that cause the one or more processors to determine to dedicate the radio channel of all cells in the wireless network.

13. The system of claim 11, where instructions that cause the one or more processors to determine whether to dedicate a radio channel to multicast stream the one or more of the videos further includes instructions that cause the one or more processors to compare a total quantity of requests for the one or more of the videos to the quantity of cells in the wireless network.

14. The system of claim 11, where the memory additionally stores instructions that cause the one or more processors to:
    store a plurality of versions of at least one of the videos, where each of the plurality of versions of the at least one of the videos corresponds to a different quality of the at least one of the videos, and where the determination to dedicate the radio channel includes dedicating a separate radio channel to each of the plurality of versions of the at least one of the videos.

* * * * *